H. W. WOLFF.
CARLINE.
APPLICATION FILED JAN. 23, 1909.

987,421.

Patented Mar. 21, 1911.
2 SHEETS—SHEET 1.

Witnesses:
Raphael Netter
G. M. Copenhaver

Herbert W. Wolff, Inventor
By his Attorney
J. H. Gibbs

H. W. WOLFF.
CARLINE.
APPLICATION FILED JAN. 23, 1909.
987,421.
Patented Mar. 21, 1911.
2 SHEETS—SHEET 2.
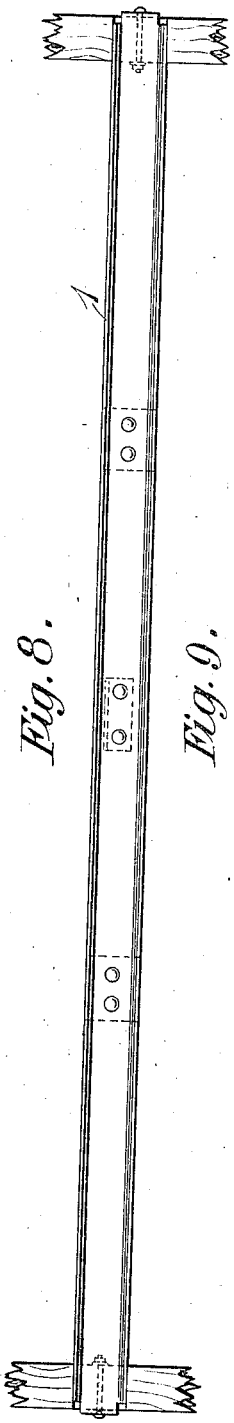
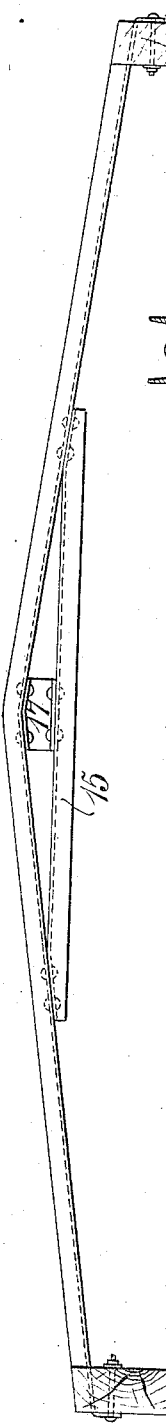
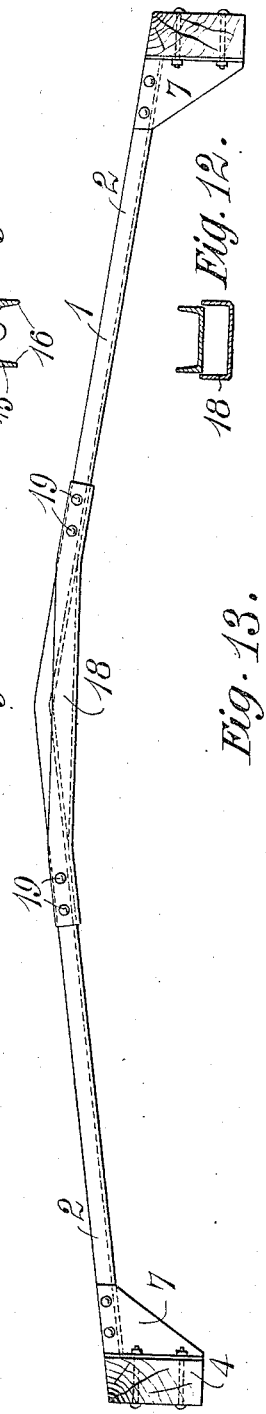
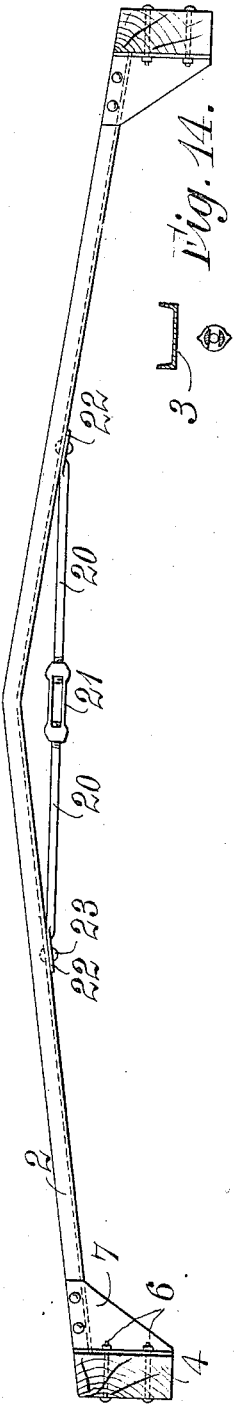
Witnesses:
Raphaël Netter
J. M. Copenhaver.
Herbert W. Wolff, Inventor
By his Attorney
L. H. Gibbs

UNITED STATES PATENT OFFICE.

HERBERT W. WOLFF, OF ST. LOUIS, MISSOURI, ASSIGNOR TO AMERICAN CAR AND FOUNDRY COMPANY, OF ST. LOUIS, MISSOURI, A CORPORATION OF NEW JERSEY.

CARLINE.

987,421.  Specification of Letters Patent.  Patented Mar. 21, 1911.

Application filed January 23, 1909. Serial No. 473,882.

*To all whom it may concern:*

Be it known that I, HERBERT W. WOLFF, residing at St. Louis, Missouri, and being a citizen of the United States, have invented certain new and useful Improvements in Carlines, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

Figure 1:
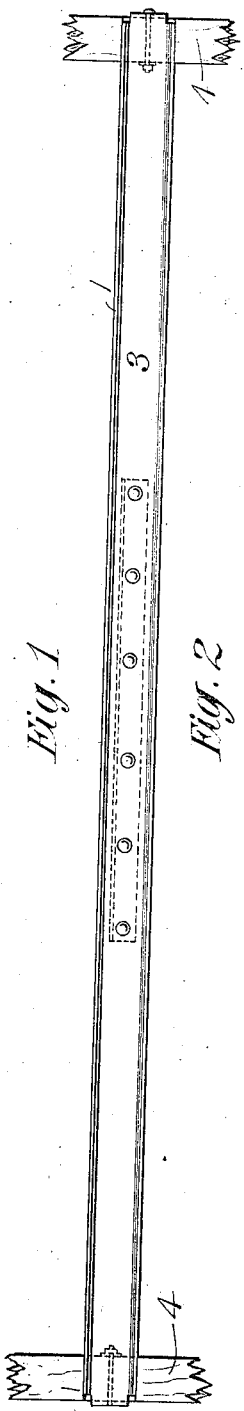
Figure 2:
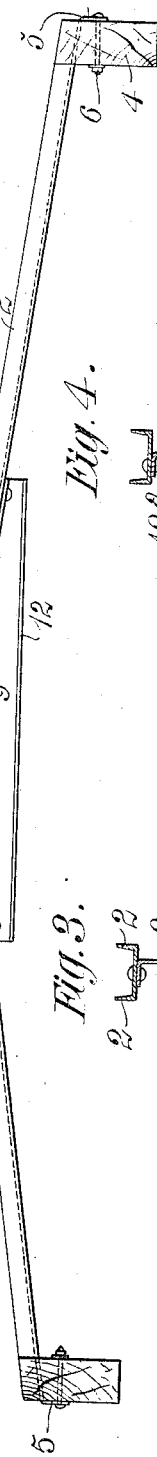
Figure 3:
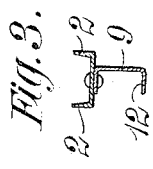
Figure 4:
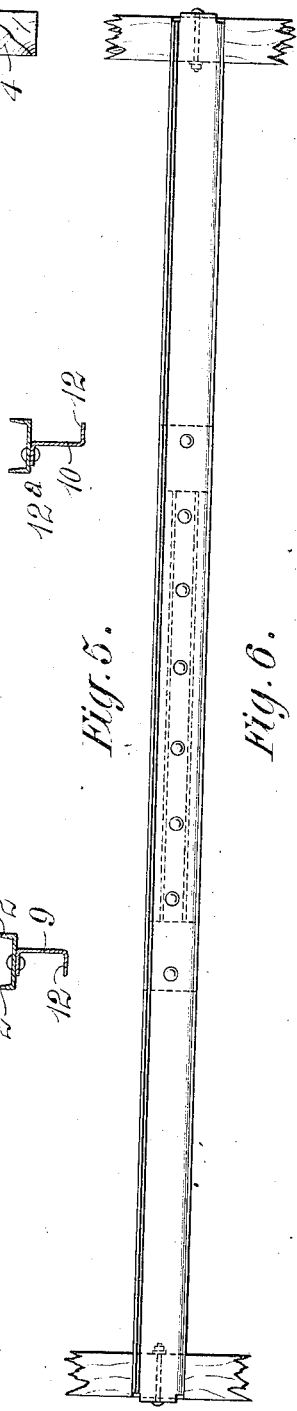
Figure 5:
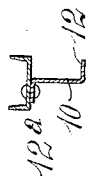
Figure 6:
Figure 7:
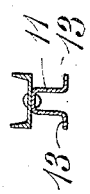

In said drawings: Figure 1 is a plan view of one form of my improved carline. Fig. 2 is an elevational view thereof. Fig. 3 is a central vertical sectional view. Fig. 4 is a central vertical sectional view of a slightly modified form wherein a Z-shaped pressing is substituted for the channel shaped pressing shown in Fig. 3. Fig. 5 is a plan view of a modified form. Fig. 6 is an elevational view of the modification shown in Fig. 5. Fig. 7 is a central vertical sectional view of the modification shown in Figs. 5 and 6. Fig. 8 is a plan view of a trussed form of carline. Fig. 9 is an elevational view of the device shown in Fig. 8. Fig. 10 is a central vertical sectional view of the modification shown in Figs. 8 and 9. Fig. 11 is an elevational view of a further modification. Fig. 12 is a central vertical sectional view of the device shown in Fig. 11. Fig. 13 is a modification showing an adjustable tension member connected with the compression member of the carline. Fig. 14 is a central vertical sectional view of the device shown in Fig. 13.

The object of the invention is to provide a new and improved form of carline composed of a cambered compression member and a tension member connected thereto relatively at the middle portion thereof within the camber of the compression member, and includes modifications and details of construction all as hereinafter more fully described and specifically pointed out in the claims.

Referring to the parts and specifically to the modifications shown in Figs. 1 to 9 inclusive, 1 is the compression member of my improved carline, which is shown as composed of a rolled channel with vertically disposed flanges 2 and horizontal web portion 3. The flanges 2 are shorter than the web portion, said flanges terminating at the side plates 4, either within the area of the said plates or extending to approximately the outer faces thereof, the web 3 preferably extending downwardly against the outer faces of said side plates as shown at 5 in said Figs. 1 to 9 inclusive, which said extensions 5 are secured to the side plates 4 by bolts 6 extending horizontally through the web extensions and said side plates.

In the modifications shown in Figs. 11-14 inclusive the compression member terminates at the inner side of the side plates 4 and flanged gusset plates 7 are connected with the flanges 2 of the compression members and are secured by bolts 6 to the side plates.

In Figs. 1 to 7 inclusive the carline is a composite structure comprising the channel 1 and connected pressed members 9, 10 or 11, each of said members 9, 10 and 11 being provided with a web portion and with bottom flange or flanges 12 or 13.

Referring particularly to Figs. 1 to 3 inclusive, the pressed member 9 is approximately U-shaped in section with its upper flange riveted to the web 3 of the channel member, with its lower or tension flange 12 free.

The modification shown in Fig. 4 includes a Z-shaped pressed member 10 with bottom flange 12 and an oppositely disposed flange 12ª, which is riveted to the web of the channel member.

In the modification shown in Fig. 6 the pendent member is of channel form in cross-section at its middle portion with laterally disposed flanges 13, while the web of this member is riveted to the web of the channel member and is of gradually decreasing width from its center toward its end, the flanges and web forming relatively plane surfaces at the end portions so that the tension flanges 13 in this modification extend to the web of the channel member 1.

In Figs. 8 to 10 inclusive is shown a trussed form of carline in which the channel 1 is cambered as in the other views, while the tension member 15 is formed of a rolled channel with its web portion up and with depending flanges 16, while a relatively U-shaped pressing 17 serves as a strut.

In Figs. 11 and 12 is illustrated a modified construction in which the carline comprises a channel 1 terminating at the side plates and connected thereto by the gusset plates 7 before referred to, while the tension member in this modification comprises a channel shaped pressed member 18 with its flanges projecting upwardly and secured by rivets 19 to the flanges 2 of the channel 1.

In Figs. 13 and 14 are illustrated a modified form of carline in which the tension member is formed of two rods 20 screw-threaded at their inner ends and connected by means of a turn-buckle 21, while the outer ends of these rods 20 are flattened at 22 and connected by rivets 23 with the web 3 of the channel 1, thereby providing means of adjustment of the tension member in this modification.

In Figs. 1 to 7 inclusive the carline comprises a composite member with tension flange, whereas in the modifications shown in the other figures a purely tension member is provided.

A channel shaped carline without the reinforcement shown and described herein has been used in car construction but has been found to be weak, in service, and leaky roofs have resulted because of lack of proper reinforcement of said carlines.

What I claim is:

1. A carline comprising two members each of which is substantially channel form in cross section, one of said members being a commercially rolled cambered channel and the other being shorter and connected thereto within the chamber of said channel, the rolled channel being of uniform cross section throughout its length.

2. In a carline, a composite member comprising an outwardly open channel member and longitudinally inclined flanges, and a vertical web extension having a horizontal flange.

3. A carline composed of a cambered compression member with a web and upstanding vertical flanges and a separate tension member secured to the web of the compression member near its middle and being flanged horizontally.

4. In a carline, a rolled channel compression member flanged outwardly and a tension member riveted to the web of said channel at each side of its middle.

5. In a carline, a cambered channel compression member and a separate shorter tension member, the end portions of which are secured to the web of said compression member.

6. In a carline, a cambered channel member, an inclined flange connected thereto, a web pendent from the flange and a flange at the lower edge of the web.

7. In a carline, an outwardly open channel member, a reinforce connected to the web of the channel member, and tension means pendent from said reinforce.

8. A carline comprising a cambered, outwardly open, channel member, and a channel pressed member having one flange fixed along and within the camber and having a pendent web and a tension flange at the lower edge of the web.

9. A carline comprising a commercially rolled channel compression member of constant cross section, and a tension member having its end portions connected to the channel by means extending through the web of the channel.

In witness whereof I have hereunto set my hand in the presence of two witnesses.

HERBERT W. WOLFF.

Witnesses:
G. P. RUNDLE,
AUG. H. WOBB.